_United States Patent Office_

3,081,329
Patented Mar. 12, 1963

3,081,329
S-HALO-O-HYDROCARBON PHOSPHOROCHLO-
RIDOTHIOLATES
Geert C. Vegter, Herne Bay, Kent, England, assignor to
Shell Oil Company, a corporation of Delaware
No Drawing. Filed Jan. 26, 1960, Ser. No. 4,608
Claims priority, application Great Britain Feb. 3, 1959
14 Claims. (Cl. 260—461)

This invention relates to a new and valuable class of organo-phosphorus compounds in which the phosphorus is present in the pentavalent state. These new compounds are, generically speaking, the esters of halido-phosphorohalidothiolic acids, and may be represented by the formula:

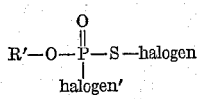

wherein R'—O' is the residue of an alcohol or phenol, R'—O—H.

These new compounds are of substantial interest in the field of organo-phosphorus chemistry, since they contain a reactive halogen atom bonded via sulfur to the phosphorus atom, and also contain a reactive halogen atom bonded directly to the phosphorus atom. With respect to the halogen atom bonded via sulfur to the phosphorus atom, the new compounds react very much like sulfenyl halides; with respect to the halogen atom bonded directly to the phosphorus atom, the new compounds react very much like phosphorus halides. Thus, I have found that in most cases the reactivity of the halogen atom bonded to the sulfur is sufficiently different from the reactivity of the halogen atom bonded to the phosphorus atom that by proper choice of reaction conditions it is easy to react the compounds of the invention, replace both halogen atoms with the same functional group, to replace but one of the halogen atoms with one functional group and the other halogen atom with a different functional group. The compounds of this invention thus are versatile raw materials for the synthesis of a wide variety of compounds having a desired functional group bonded via sulfur to the phosphorus atom, and having the same, or another functional group bonded directly to the phosphorus atom. In particular, the new compounds are of direct interest as the raw materials for the synthesis of compounds, particularly thiolo-phosphate esters, which exhibit a high level of insecticidal activity.

Referring to the foregoing formula, "halogen" and "halogen'" each may be an atom of the same halogen, or each may be an atom of a different halogen. Preferably, each is a middle halogen atom—that is, a bromine or a chlorine atom. In many cases, it will be found desirable that both "halogen" and "halogen'" be atoms of the same halogen.

Also referring to the foregoing formula, the group "R'" suitably may be a substituted or an unsubstituted aliphatic, alicyclic, aromatic (i.e., aryl), araliphatic, or alkaryl group. Preferably, R' represents hydrocarbon, halogen-substituted hydrocarbon, nitro-substituted hydrocarbon or alkoxy-substituted hydrocarbon of up to ten carbon atoms wherein the alkoxy group or groups contain a total of up to four carbon atoms. The aliphatic groups can be straight-chain or branched-chain in configuration; they may be saturated or olefinically unsaturated. Preferably, they are free from acetylenic unsaturation. Suitable aliphatic groups thus include the alkyl groups, alkenyl groups and alkadienyl groups, and such groups substituted by one or more halogen, preferably bromine or chlorine, atoms. The alicyclic groups likewise can be saturated or they can be olefinically unsaturated, but preferably are free from acetylenic unsaturation, and can be halogen-substituted. The preferred alicyclic groups contain from 4 to 6 carbon atoms in the ring and may be substituted by, for example, alkyl or haloalkyl groups, or halogen atoms. The preferred aromatic groups are the phenyl group, alkyl-substituted, alkoxy-substituted, haloalkyl-substituted, halo-substituted and nitro-substituted phenyl groups. The preferred araliphatic groups are the preferred aliphatic groups set out above which are substituted by one or more of the preferred aromatic groups set out above.

For use in the preparation of insecticides, and because of the high insecticidal activity of the insecticides prepared therefrom, the new compounds wherein R' represents an alkyl group of up to 8 carbon atoms, the phenyl group, a nitrophenyl group or a halophenyl group are preferred.

The following are typical species of the compounds of the invention, set out to exemplify and illustrate the new class of compounds. Typical of the new esters are methyl chloridophosphorochloridothiolate, methyl bromidophosphorochloridothiolate, ethyl bromidophosphorobromidothiolate, isopropyl chloridophosphorobromidothiolate, trichloromethyl chloridophosphorobromidothiolate, 2-chloroethyl bromidophosphorobromidothiolate, phenyl bromidophosphorofluoridothiolate, p-nitrophenyl chloridophosphorobromidothiolate, allyl fluoridophosphorobromidothiolate, cyclohexyl chloridophosphorochloridothiolate, cyclohexenyl bromidophosphorobromidothiolate, sec-butyl bromidophosphorochloridothiolate, p-chlorophenyl chloridophosphorobromidothiolate, and the like.

The new compounds are readily prepared by treating with a chlorinating agent a diester of a phosphorohalidothionic acid, that is, a compound having the formula:

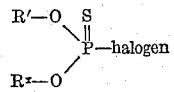

wherein R' and "halogen" have the respective meanings already set out, and R$^x$ represents the groups represented by R', but preferably is a lower alkyl group These diesters form a well known class of compounds, and methods for their preparation are described in Chapter 9 of Kosolopoff, "Organophosphorus Compounds," Wiley, 1950.

Typical of these diesters are dimethyl phosphorochloridothionate, diethyl phosphorochloridothionate, diethyl phosphorobromidothionate, ethyl butyl phosphorochloridothionate, ethyl trichloromethyl phosphorochloridothionate, methyl phenyl phosphorobromidothionate, ethyl benzyl phosphorofluoridothionate, isopropyl 2-chloroethyl phosphorochloridothionate, ethyl p-chlorophenyl phosphorobromidothionate, ethyl allyl phosphorochloridothionate and the like.

While any available halogenating agent is suitable, the preferred halogenating agents are the sulfuryl halides or the halogen itself.

The halogenation of the phosphorohalidothionic acid ester is conducted by causing one molar equivalent of the ester to react with one molar equivalent of the chlorinating agent at a temperature below about 0° C. In some cases, it will be found advantageous to use temperatures as low as −30° C., and in most cases, it will be found preferable to use temperatures not exceeding about −10° C.

Where the halogen is used as the halogenating agent, the principal by-product is the organic halide, R$^x$-halogen. Where a sulfuryl halide is used, an additional major by-product will be sulfur dioxide. The ester of the halido-phosphorohalidothiolic acid which is the desired product is most conveniently separated from the by-products and recovered by distillation under reduced pressure, to avoid thermal decomposition of the product. All of the operations should be conducted in the absence of molecular oxygen and under anhydrous conditions.

Preparation of a typical compound of this invention is shown in the following example. It is to be understood that the other compounds of the invention are prepared by a like procedure, employing the requisite starting material, halogenating agent and conditions already described herein. In this example, p.b.w. stands for parts by weight and p.b.v. stands for parts by volume, the relationship between parts by volume and parts by weight being the same as exists between cubic centimeters and grams.

EXAMPLE I 377 p.b.w. of diethylphosphorothionochloridate was cooled to −20° C., and 270 p.b.w. of sulfuryl chloride was added while the reaction mixture was kept well stirred. During the addition of the sulfuryl chloride the temperature of the reaction mixture was kept well below −10° C. and after the addition of the sulfuryl chloride had been completed the reaction mixture was stirred continuously for a further one-half hour at −10° C. The reaction mixture was an orange-colored liquid which contained besides ethyl chloride and sulfur dioxide the quantitative amount of the ethyl ester of chloridophosphorochloridothiolic acid.

The new compounds are useful primarily as intermediates in the preparation of organo-phosphorus compounds suitable for use as insecticides and/or lubricating oil additives and/or detergents. These useful organo-phosphorus compounds may be prepared by reacting the new esters with members of at least four different groups of organic compounds:

(1) The esters of this invention add to olefinically unsaturated and acetylenically unsaturated carbon atoms, the reaction occurring at the halogen atom bonded to the sulfur atom—"halogen" of the formula.

Suitable olefins and acetylenes include the unsubstituted mono- and polyolefins and the unsubstituted mono- and polyacetylenically unsaturated hydrocarbons of straight-chain, branched-chain, cyclic and mixed configurations. Preferably, the polyolefins are of conjugated configuration. Suitable, thus, are cyclohexene, ethylene, propylene, butylene, cyclopentadiene, cyclohexadiene, butadiene, acetylene, alkylacetylenes, pentyne-1, pentyne-2, 3-methylbutyne-1, hexyne-1, hexyne-2, hexyne-3, 3,3-dimethylbutyne-1, octadecyne-1, vinyl benzene, and the like. Also suitable are the olefinic and acetylenic esters of organic and inorganic acids, including the mono- and polycarboxylic acids, mono- and polysulfonic acids, halogen acids, strong mono- and polybasic inorganic acids, and the like, the esters including those wherein the ester moiety contains the unsaturation, and those wherein the acid moiety contains the unsaturation. Typical examples include methyl vinyl sulfone, vinyl acetate, allyl acetate, allyl propionate, itaconic esters, fumaric esters, maleic esters, propargyl acetate, propargyl halides, allyl chloride, and the like. Addition can take place at but one, or at all olefinically unsaturated linkages of the unsaturated reactant.

The reaction between the compounds of the present invention and these unsaturated compounds follows the following course, illustrated by the schematic equations:

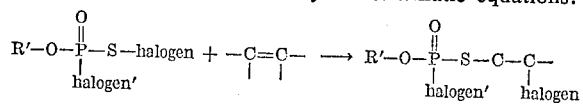

or

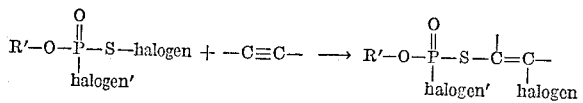

(2) The esters of this invention react with amines, alcohols, phenols and mercaptans, reaction generally taking place first at the halogen atom bonded to the sulfur atom. In the case of amines, the reaction occurs according to the equation:

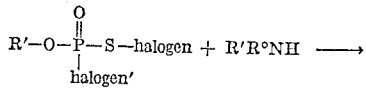

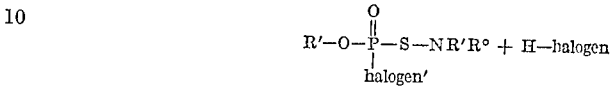

wherein R° represents hydrogen or the groups represented by R' and the other symbols have the respective meanings already set out herein. In some cases where a primary amine is used, two molecules of the ester will react with one molecule of the amine to give sulphenimides.

The amines suitable are primary or secondary in character, the organic group or groups present therein being those represented by the symbol R'. Typical suitable amines include alkyl primary and secondary amines, such as methylamine, ethylamine, n-propylamine, isopropylamine, octylamine, n-pentylamine, dimethylamine, diethylamine, methyl isopropylamine, ethyl butylamine, and the like, alkenylamines, such as allylamine, diallylamine, methyl allylamine, crotylamine, and the like, aromatic amines, such as aniline, diphenylamine, p-methylaniline, m-ethylaniline, and the like, aralkylamines, such as benzylamine, and mixed amines, such as methyl phenylamine, ethyl benzylamine, and the like.

Alcohols and phenols react in a similar fashion, according to the general equation

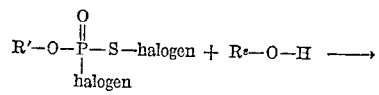

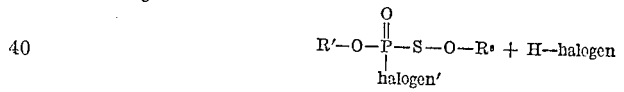

wherein R$^s$ represents the groups represented by R', and the other symbols have the respective meanings already set out.

The alcohols suitably are aliphatic, cycloaliphatic or araliphatic in character. If aliphatic, they may be of straight-chain or of branched-chain configuration. Preferably, they are free from acetylenic unsaturation, although suitably they may contain olefinic unsaturation. The phenols preferably are mono-nuclear in character, phenol itself, and hydrocarbon-substituted phenols being preferred.

Mercaptans react in precisely a similar fashion as the alcohols, the reaction being represented by the equation representing the reaction of the alcohols, except that the mercaptan is represented by the formula R$^s$—S—H, whereas the alcohol has the formula R$^s$—O—H.

(3) The esters of the invention react with compounds containing an activated aromatic nucleus—i.e., compounds containing an aromatic ring which is substituted with a strong electron releasing group. Examples of such compounds include dimethyl aniline, naphthyl amine, 1,3-dimethoxybenzene. The esters of the present invention react with such compounds to give a reaction which probably entails nuclear substitution in the para position to the activating group. This reaction is illustrated by the reaction between ethylphosphorochloridothiolic chloride and dimethyl aniline, which proceeds as follows:

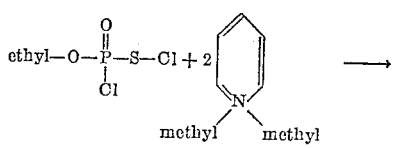

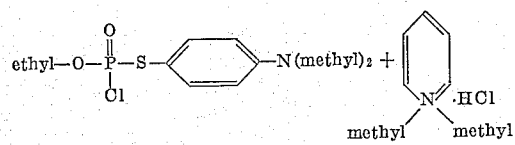

(4) The esters of the invention will react with compounds containing an active methylene group. Compounds containing active methylene groups are well known in organic chemistry and are usually compounds which contain a methylene group attached to which are one or more electron-attracting groups. Such compounds include ketones and dicarboxylic acids such as malonic acid or its esters. The reaction between the intermediate phosphorus compounds of the present invention and such compounds containing active methylene groups is illustrated by the reaction between a phosphorus intermediate compound of the present invention and acetylacetone which will proceed as follows:

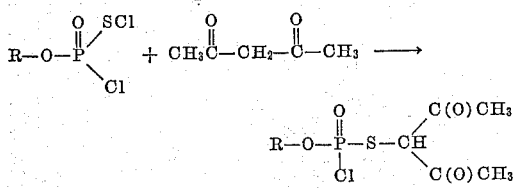

Examples of compounds according to the present invention which may be prepared by the methods outlined above include O-ethyl S-acetylthioethylphosphorochloridothiolate, O - ethyl - S - acetoxymethylphosphorochloridothiolate, O - ethyl - S - 2 - acetoxymethylthioethylphosphorochloridothiolate, O - methyl - S - 3 - acetylthiopropylphosphorochloridothiolate, O - ethyl - S - 2-benzoyloxyethylphosphorochloridothiolate, O - ethyl - S-2,3 - dichloro - 1 - chloromethyl - propylphosphorochloridothiolate, O - ethyl - S - 2 - chlorotrichloroacetylthiopropylphosphorochloridothiolate, O - ethyl - S - 2 - propionyloxymethylthioethylphosphorochloridothiolate.

It will be understood that in each of the four general types of reactions set forth in the preceding paragraphs, by proper choice of reaction conditions the halogen atom of the esters of the invention which is directly bonded to the phosphorus atom can also be reacted with the reactant chosen for reaction with the halogen atom bonded to the sulfur atom, in the esters of the invention. Where the reaction conditions have been so chosen that only the halogen atom bonded to the sulfur atom has occurred, the resulting compound can be further reacted to involve reaction of the halogen atom bonded directly to the phosphorus atom. The halogen atom directly bonded to the phosphorus atom has the properties of an ordinary phosphoryl chloride atom, and therefore can be reacted with compounds which react with phosphoryl chloride groupings—for example, amines, alcohols or mercaptans—thus giving other organic compounds which may be more suitable as insecticides, lubricating oil additives or detergents. This procedure affords a very good method of preparing compound of the type:

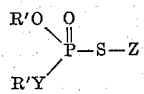

where Y represents O, S, NH or NR''; Z represents an organic radical; and R' has the meaning set out hereinbefore. This process is particularly useful for preparing compounds in which each of R' is a different radical. Thus for example all the members of the various classes of compounds which can be prepared by the methods described above, which contain a phosphoryl chloride grouping, can be reacted further with an alcohol, preferably in the presence of a base such as lutidine, to give the corresponding alkoxy compounds. Thus for example using methyl, ethyl, isopropyl or isobutyl alcohol, the corresponding O-methyl, O-ethyl, O-isopropyl or O-isobutyl derivatives may be formed. In a similar way these phosphorochloridothiolates may be reacted with amines or mercaptans.

A group of compounds which is of particular interest which may be prepared by the process of the present invention are the O-hydrocarbyl-S-2-halidocyclohexylphosphosphorohalidothiolates. These may be prepared by reacting a hydrocarbylphosphorohalidothiolic halide with cyclohexene. The remaining phosphoryl chloride radical may then be reacted with, for example, an alcohol to give O,O - dihydrocarbyl - S - 2 - halidocyclohexylphosphorothiolates—i.e., compounds having the general formula:

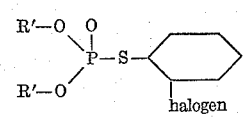

where R' has the meaning already set out. Each of R' preferably is an alkyl group containing not more than four carbon atoms—as in, for example, O,O-diethyl-S-2-chlorocyclohexylphosphorothiolate. These compounds are useful as insecticides, those in which the two alkyl groups are different being of particular value. Examples of such compounds are O-ethyl-O-isopropyl-S-2-chlorocyclohexylphosphorothiolate and the analogous O-methyl-O-ethyl, O-ethyl-O-isobutyl-, and O-methyl-O-isobutyl-homologues.

The esters of the invention are of particular value as raw materials for the preparation of valuable insecticides which form the subject matter of my copending application Serial No. 852,604, filed November 13, 1959. An ester of the invention is reacted with an ester of an olefinically or acetylenically unsaturated alcohol and the resulting phosphorochloridothionate is reacted with a hydroxy compound R'OH. If it is desired that both groups R' in the final product be the same, the R' of the hydroxy compound is the same as R' of the phosphorochloridothionate; if desired, then the groups, R', can be different. The reaction sequence is illustrated by the equations:

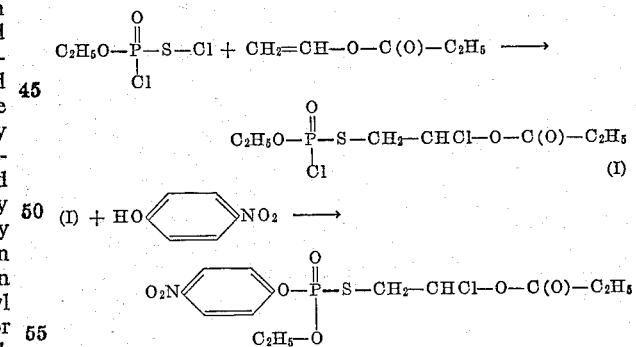

All of the reactions set out above should be carried out under anhydrous conditions. An inert solvent, such as ether, halogenated hydrocarbons such as carbon tetrachloride, or a liquid aliphatic or aromatic hydrocarbon, such as hexane, benzene, xylenes or the like, may be employed to advantage in some cases, but may be omitted if one or more of the reactants are liquid. The addition reactions to unsaturated compounds in some cases proceed vigorously, usually after an induction period of a few minutes; in other cases, it may be necessary to add a small amount of a suitable catalyst which provides or causes generation of free radicals. The usual generators of free radicals such as actinic radiation and organic peroxides, such as benzoyl peroxide, are suitable. These addition reactions are preferably effected initially at below about 40° C., with the reaction mixture eventually being heated at about 70° C. to 80° C. for about an hour to insure completion of the reaction. The other reactions described above are, in general, effected at about 70° C. to 80° C. Reactions involving evolution of a hydrogen halide are preferably effected in the presence of a hydrogen halide acceptor, an organic tertiary nitrogen base such as pyridine or an alkyl pyridine being preferred for this purpose.

When reaction is complete, any precipitate formed can be filtered off and any solvent or other volatile material removed by distillation, preferably under reduced pressure. The residual esters are, in general, liquids. Some are sufficiently heat-stable to allow distillation in a high vacuum. Less stable liquids can be purified by thorough washing with water, drying and warming in a high vacuum to remove volatile impurities. Solid esters can be purified by recrystallization.

The following examples illustrate the preparation of derivatives of novel compounds of the invention, the parts by weight (p.b.w.) and parts by volume (p.b.v.) bearing the same relation as the kilogram bears to the liter.

EXAMPLE II

To a reaction mixture which contained ethylphosphorochloridothiolic chloride prepared as in Example I was added 169 p.b.w. (an equimolecular proportion) of cyclohexene. During the addition an exothermic reaction took place but the temperature of the reaction mixture was kept below $-10°$ C. When the addition had been completed the volatile by-products were removed by distillation at 13 millimeters mercury pressure and a bath temperature not exceeding 40° C. The residue was O-ethyl S-2-chlorocyclohexyl phosphorochloridothiolate. Analysis: C, 34.8%; H, 6.0%; S, 12.0%. Calculated for $C_8H_{15}Cl_2O_2PS$: C, 34.7%; H, 5.4%; S, 11.55%.

EXAMPLE III

To a reaction mixture containing O-ethyl S-2-chlorocyclohexyl phosphorochloridothiolate prepared as described in Example II was added 186 p.b.w. (two times the equimolecular amount) of aniline, and the anilide was isolated and found to have the following analysis: C, 51.7%; H, 6.8%; S, 10.0%. Calculated for $C_{14}H_{21}ClNO_2PS$: C, 50.4%; H, 6.3%; S, 9.6%.

EXAMPLE IV

To a reaction mixture containing O-ethyl S-2-chlorocyclohexyl phosphorochloridothiolate, prepared as described in Example II was added 74 p.b.w (an equimolecular amount) of isobutyl alcohol, and after that 107 p.b.w. (an equimolecular amount) of 2,6-lutidine was added. Initially the temperature was kept below 70° C. When the exothermic reaction ceased, the mixture was kept at 50°C. for another 30 minutes. After cooling the reaction mixture was taken up in ether, washed with water and dried over $Na_2SO_4$. After evaporation of the ether, the O-ethyl O-isobutyl S-2-chlorocyclohexyl phosphorothiolate was obtained as a bottom product in 85% yield. The product was found to have the following analysis: C, 45.9%; H, 0.4%; S, 10.0%. Calculated for $C_{12}H_{24}O_3ClPS$: C, 45.8%; H, 7.6%; S, 10.2%. The O-ethyl O-isobutyl S-2-chlorocyclohexyl phosphorothiolate prepared according to this example was active as an insecticide, its toxicity to Tribolium confusum, for example, being greater than one-fifth of the toxicity of dieldrin.

EXAMPLE V

Using the same procedure as described in Example IV but using an equimolecular amount of methyl alcohol instead of the isobutyl alcohol, a good yield of O-methyl O-ethyl S-2-chlorocyclohexyl phosphorothiolate was obtained. This compound had good insecticidal properties, being toxic, for example, towards Tribolium confusum and Musca domestica.

EXAMPLE VI

Using the same procedure as described in Example IV except that an equimolecular amount of isopropyl alcohol was used instead of the isobutyl alcohol, a good yield of O-ethyl O-isopropyl S-2-chlorocyclohexyl phosphorothiolate was obtained. This compound had good insecticidal properties, being toxic, for example, towards Musca domestica and Tribolium confusum, its toxicity towards the latter insect being greater than one-fifth of the toxicity of dieldrin.

EXAMPLE VII

To a reaction mixture containing ethyl phosphorochloridothiolic chloride prepared as in Example I was added 242 p.b.w. of dimethyl aniline (two times the equimolecular amount) while the temperature was kept below $-10°$ C. Ether was used as the solvent. After the addition the temperature was allowed to rise to room temperature and the dimethyl aniline hydrochloride was removed by filtration. To the filtrate 60 p.b.w. of isopropyl alcohol was added (an equimolecular amount) and 107 p.b.w. of 2,6-lutidine (an equimolecular amount) was added. Initially the temperature was kept below 30° C. When the exothermic reaction ceased, the mixture was boiled under reflux for half an hour. Then it was extracted with water, with dilute hydrochloric acid, and again with water and dried over $Na_2SO_4$. After evaporation of the ether, the O-ethyl O-isopropyl S-4-dimethylaminophenyl phosphorothiolate was obtained as a viscous, light-brown oil. The over-all yield was 60%. The product was found to have the following analysis: C, 49.6%; H, 6.8%; N, 5.1%. Calculated for $C_{13}H_{22}O_3NPS$: C, 57.4%; H, 7.2%; N, 4.6%.

EXAMPLE VIII

*Preparation of O-Ethyl O-p-Nitrophenyl S-2-Chloro-2-Propionyloxyethyl Phosphorothiolate*

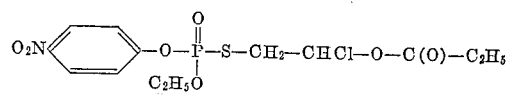

(a) *Preparation of the intermediate O-ethyl S-2-chloro-2-propionyloxyethyl phosphorochloridothionate.*

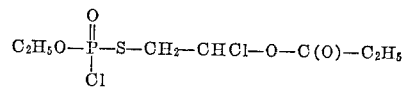

Sulfuryl chloride (40.5 p.b.w.; 0.3 mol) was added with stirring to diethyl phosphorochloridothionate (56.6 p.b.w.; 0.3 mol), the reaction temperature being kept below $-10°$ C., thereby forming ethyl phosphorochloridothiolic chloride. After the addition was complete, stirring was continued for a further 30 minutes at $-10°$ C. Vinyl propionate (30 p.b.w.; 0.3 mol) was then added with stirring, the temperature being kept at $-10°$ C. during the addition. The reaction mixture was then allowed to come to room temperature and the ethyl chloride and sulfur dioxide formed were removed by distillation at 13 millimeters mercury pressure from a bath at room temperature. The residue in the vessel consisted of the desired intermediate (98% yield).

(b) *Preparation of O-ethyl O-p-nitrophenyl S-2-chloro-2-propionyloxyethyl phosphorothiolate.*—The intermediate prepared in (a) (29.5 g.; 0.1 mol) was added to p-nitrophenol (13.9 p.b.w.; 0.1 mol) and 1,2-dichloroethane (50 p.b.v.) added to aid solution of the phenol. Pyridine (7.9 p.b.w.; 0.1 mol) was then added with stirring, the temperature of the exothermic reaction being kept below 40° C. by external cooling. When addition was complete, the reaction mixture was warmed to 65° C., and kept at this temperature for 15 minutes. After standing overnight, the mixture was diluted with 1,2-dichloroethane (500 p.b.v.) and this solution was washed once with water, twice with 5% aqueous sodium bicarbonate solution and again with water, and then dried over anhydrous magnesium sulfate. The solvent and other low-boiling products were removed by distillation under reduced pressure, finally at 0.004 millimeter mercury pressure, and a bath temperature of 60° C. The residue, a viscous brown oil, consisted of O-ethyl O-p-nitrophenyl S-2-chloro-2-propionyloxyethyl phosphorothiolate. Yield 12 p.b.w. (30%). Analysis: Found: N, 3.7%; S, 8.4%; Cl 8.4%. $C_{13}H_{17}O_7NSClP$ requires N, 3.5%; S, 8.1%; Cl 8.9%. In a similar way was prepared the o-nitrophenyl derivative. The p-nitrophenyl ester is a promising insecticide, being highly toxic to the diamond-back moth larvae (*Plutella maculipennis* (Curtis)), the pea aphid (*Acyrthosiphon pisum* (Harns)), and the red spider mite (*Tetranychus telarius* (Linn.)).

EXAMPLE IX

*Preparation of O-Ethyl O-2,4 Dichlorophenyl S-2-Chloro-2-Propionyloxyethyl Phosphorothiolate*

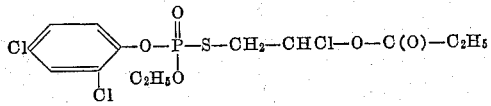

O-ethyl S-2-chloro-2-propionyloxyethyl phosphorochloridothionate prepared as described in Example VIII(a) (29.5 p.b.w.; 0.1 mol) and 2,4-dichlorophenol (16.3 p.b.w.; 0.1 mol) were dissolved in benzene (50 p.b.v.). To this solution was added pyridine (7.9 p.b.w.; 0.1 mol) with stirring, the reaction temperature being kept below 40° C. When the addition was complete, the mixture was warmed to 65° C. and kept at this temperature for 15 minutes. After standing overnight, benzene (600 p.b.v.) was added and the solution washed twice with water and dried over anhydrous sodium sulfate. The benzene and other volatile products were removed by distillation under reduced pressure, finally at 0.003 millimeter mercury pressure and a bath temperature of 75° C. The residue, a dark brown oil, consisted of O-ethyl O-2,4-dichlorophenyl S-2-chloro-2-propionyloxyethyl phosphorothiolate. Yield, 23 p.b.w. (58%). Analysis: Found: C, 39.1%; H, 3.9%, S, 6.9%; Cl, 27.0%. $C_{13}H_{16}O_5SCl_3P$ requires C, 37.0%; H, 3.8%, S, 7.6%; Cl, 25.3%. In a similar way the 2-chloro-, 3,4-dichloro- and 2,4,5-triphenyl derivatives were prepared. The dichlorophenyl ester is a highly specific, highly toxic insecticide to the red spider mite (*Tetranychus telarius* (Linn.)).

The invention thus provides insecticidal compositions which are characterized by high toxicity towards insects, but substantially no toxicity towards plant life, so that these insecticidal compositions can be effectively used for eradication of insects and similar pests and for protection of plant life against the ravages of insects. By the term "insects" is meant not only the members of the class Insecta, but also relates to similar organisms belonging to allied classes of arthropods, and including mites, ticks, spiders, wood lice, and the like.

These insecticidal compositions include liquid solutions and dispersions of the active ingredients in a suitable liquid carrier, these compositions being suitable for application in the form of sprays or dips, or by means of brushing. Suitable liquid carriers are those which are well-known in the art to be non-toxic to plants, and include such materials as kerosene, or similar light mineral oil distillates of intermediate viscosity and volatility. In addition to such carriers, other adjuvants may be employed to enhance the effectiveness of the toxic materials. Such other adjuvants include spreading or wetting agents such as fatty acid soaps, rosin salts, saponins, gelatin, casein, or other proteinaceous material, or synthetic wetting agents of the type of sulfates of long-chain fatty alcohols, alkyl aryl sulfonates, long-chain alkyl sulfonates, phenol-ethylene oxide condensates, $C_{12}$ to $C_{20}$ amines, and the like. The solution of the toxic material may be dispersed or emulsified in water, and the resulting dispersion or emulsion applied as the spray.

These insecticidal compositions may be in the form of finely divided solids, the active material being combined with a finely divided solid carrier such as talc, bentonite, lime, gypsum, pyrophillite or the like. The compositions may also contain sticking agents, emulsifying agents or other materials which enhance the effectiveness of the toxic materials.

If desired, the composition may be in the form of an aerosol, the toxic material being dispersed into the air, or atomized into a spray, by means of a compressed gas.

The concentration of toxic material in the insecticidal compositions will depend on many factors, such as the particular toxic material or materials which are used, the carrier used, the method and conditions of application, the insect species to be controlled, etc., the proper consideration of these factors being within the skill of those versed in the art. In general, the toxic materials hereinbefore-described will be effective in concentrations of from about 0.01% to about 0.5% by weight, based upon the total weight of the composition, although, depending upon the circumstances, as little as about 0.001% or as much as 2% or even more of the toxic material may be employed effectively.

In these insecticidal compositions, the toxic agents hereinbefore-described may be employed as the sole toxic ingredient, or they may be employed in conjunction with other insecticidally active materials. Such other insecticidally active materials include, without being limited to, the naturally occurring insecticides, such as pyrethrum, rotenone, sabidilla, and the like, as well as synthetic materials such as compounds of arsenic, lead, and/or fluorine; DDT, benzene hexachloride, thiodiphenylamine, cyanides, O,O-diethyl-O-p-nitrophenyl thiophosphate, azobenzene, dieldrin, aldrin, and the like.

This application is a continuation in part of my copending application Serial No. 852,604, filed Nov. 13, 1959.

I claim as my invention:

1. The compound having the formula:

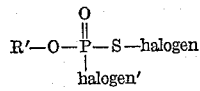

wherein R' is selected from the group consisting of hydrocarbon, halogen-substituted hydrocarbon, nitro-substituted hydrocarbon, and alkoxy-substituted hydrocarbon wherein the alkoxy group contains up to 4 carbon atoms and the hydrocarbon is selected from the group consisting of alkyl, alkenyl, alkadienyl, cycloalkyl cycloalkenyl, cycloalkadienyl and aryl groups of up to 10 carbon atoms.

2. The compound having the formula:

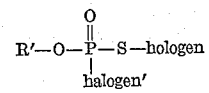

wherein R' is alkyl of up to 10 carbon atoms.

3. The compound of the formula:

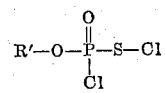

wherein R' is alkyl of up to 8 carbon atoms.

4. The compound having the formula

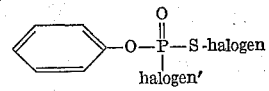

5. The compound having the formula

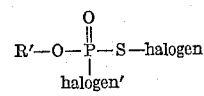

wherein R' is nitrophenyl.

6. The compound having the formula

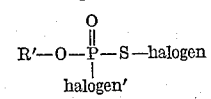

wherein R' is halophenyl.

7. Ethyle chloridophosphorochloridothiolate.
8. Methyl chloridophosphorochloridothiolate.
9. Phenyl bromidophosphorofluoridothiolate.
10. p-Nitrophenyl chloridophosphorobromidothiolate.
11. p-Chlorophenyl chloridophosphorobromidothiolate.
12. The process for preparing a compound of claim 1 which comprises halogenating one molar equivalent of a compound of the formula

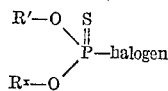

wherein R' and R$^x$ are both selected from the group consisting of hydrocarbon, halogen-substituted hydrocarbon, nitro-substituted hydrocarbon, alkoxy-substituted hydrocarbon wherein the alkoxy group contains up to 4 carbon atoms and the hyrocarbon is selected from the group consisting of alkyl, alkenyl, alkadienyl, cycloalkyl, cycloalkenyl, cycloalkadienyl and aryl groups of up to 10 carbon atoms, with one molar equivalent of a halogenating agent selected from the group consisting of a sulfuryl halide and a molecular halogen at a temperature below about 0° C.

13. The process for preparing a compound of claim 2 which comprises halogenating one molar equivalent of a compound of the formula

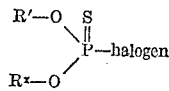

wherein R' and R$^x$ are both alkyl of up to 8 carbon atoms, with one molar equivalent of a sulfuryl halide at a temperature below about 0° C.

14. The process for preparing a compound of claim 3 which comprises halogenating one molar equivalent of a compound of the formula

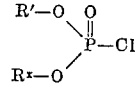

wherein R' and R$^x$ are both alkyl of up to 8 carbon atoms, with one molar equivalent of sulfuryl chloride in the absence of molecular oxygen and under anhydrous conditions at a temperature of from about −30° C. to about −10° C.

References Cited in the file of this patent
UNITED STATES PATENTS
2,692,893    Hechenbleikner _____ Oct. 26, 1954

OTHER REFERENCES

Fletcher et al.: J. Am. Chem. Soc., 72, 2461–2464 (1950).